(12) United States Patent
You

(10) Patent No.: US 7,397,769 B2
(45) Date of Patent: Jul. 8, 2008

(54) ADSL MODEM FOR PROVIDING IPOA, PPPOA, OR PPPOE BASED DIAL-UP NETWORKING SERVICE OVER ETHERNET

(75) Inventor: Shun I You, Hsinchu (TW)

(73) Assignee: D-Link Corporation, Hsinchu (TW)

( * ) Notice: Subject to any disclaimer, the term of this patent is extended or adjusted under 35 U.S.C. 154(b) by 932 days.

(21) Appl. No.: 10/704,798

(22) Filed: Nov. 12, 2003

(65) Prior Publication Data
US 2005/0100041 A1    May 12, 2005

(51) Int. Cl.
H04L 12/28 (2006.01)
H04L 12/56 (2006.01)
G06F 15/16 (2006.01)

(52) U.S. Cl. .................. 370/254; 370/395.21; 709/228

(58) Field of Classification Search . 370/395.2–395.61, 370/400–401, 484–490, 254, 465–466, 469; 709/220–222, 227–228, 250; 375/222
See application file for complete search history.

(56) References Cited

U.S. PATENT DOCUMENTS

| 5,790,548 | A | * | 8/1998 | Sistanizadeh et al. | 370/401 |
| 6,847,649 | B2 | * | 1/2005 | Sutanto | 370/401 |
| 6,958,996 | B2 | * | 10/2005 | Xiong | 370/389 |
| 7,032,012 | B2 | * | 4/2006 | Roh | 709/220 |
| 2006/0206625 | A1 | * | 9/2006 | Moineau | 709/245 |

* cited by examiner

*Primary Examiner*—Chi H. Pham
*Assistant Examiner*—Tri H Phan
(74) *Attorney, Agent, or Firm*—Bacon & Thomas, Pllc

(57) ABSTRACT

The present invention is to provide an ADSL modem for providing an IPoA, a PPPoA, or a PPPoE based dial-up networking service over Ethernet, which comprises a DHCP server coupled to at least one computer, each computer is adapted to use a DHCP provided by an OS thereof to obtain an authorized IP address and associated settings from an ISP through the DHCP server, and the DHCP server is adapted to assign the authorized IP address and the associated settings to each computer, enabling at least one computer to access the Internet without installing any driver or application program.

8 Claims, 2 Drawing Sheets

ADSL MODEM FOR PROVIDING IPOA, PPPOA, OR PPPOE BASED DIAL-UP NETWORKING SERVICE OVER ETHERNET

FIELD OF THE INVENTION

The present invention relates to DSL (Digital Subscriber Line) technology and more particularly to an ADSL modem capable of providing an IPoA, PPPoA, or PPPoE based dial-up networking service over Ethernet.

BACKGROUND OF THE INVENTION

The Internet is booming in recent years. The World Wide Web ("the Web"), as the multimedia portion of the Internet, can provide a variety of services by combining voice, graphics, and dynamic images together in addition to the typical e-mail service. It is understood that a substantial amount of data is associated with, for example, multimedia. As such, the typical dial-up networking involving the use of phone line and modem cannot provide the capability of transferring a substantial amount of data as required by multimedia by simply providing 28.8 Kbps, 33.6 Kbps, or 56 Kbps. In some conditions, even a local network or ISDN (Integrated Services Digital Network) cannot provide a data transfer rate acceptable by network users.

For providing higher data transfer rate, many ISPs (Internet Service Providers) submitted solutions in which the interesting one of the solutions is DSL. DSL, as self-explanatory, is a digital subscriber line different from the typical POTS (Plain Old Telephone Service). DSL has many types collectively called xDSL. In the existing xDSL, ADSL (Asymmetric Digital Subscriber Line) technology is the most important one because ADSL involves the use of POTS as means for carrying out a high data transfer rate without modifying and/or expanding the existing data transfer infrastructure. Also, associated operating standards are stipulated. Further, products associated with ADSL are widely used by businesses and individuals in their daily work and life. Such increasing popularity of ADSL not only increases data transfer rate and efficiency but also brings a great convenience to our daily life and work.

As stated above, ADSL involves the use of POTS the same as the typical PSTN (Public Switched Telephone Network). ADSL using a dedicate modem can obtain a data transfer rate in the range of 1.5M bps to 9M bps in download or 64K bps to 640K bps in upload. Variation is possible due to different ADSL modem types, data transfer modes, and/or data transfer distances in which the data transfer distance is the most important factor. The different data transfer rates between download and upload (e.g., download being faster about 10 times than upload) is the reason why such DSL is called asymmetric DSL.

Conventionally, a PPP (Point-to-Point Protocol) is used between a computer at a end user and a server of ISP for transferring data over ADSL. A user can use an ADSL modem and phone line to transfer data in an ATM (Asynchronous Transfer Mode) over the Internet. An ISP may provide one of two means for providing IpoA (IP (Internet Protocol) over ATM, PPPoA (Point-to-Point Protocol over ATM) or PPPoE (Point-to-Point Protocol over Ethernet, i.e., RFC 2516 Protocol) based dial-up networking service over ADSL depending on applications. These means are detailed below.

(1) ADSL modem. A user couples an ADSL modem to his/her computer. Next, the user can use the computer to transmit data, receive data, and/or browse by means of the ADSL modem over the Internet. The accessing to the Internet by an ADSL modem is inexpensive. But only one computer is allowed to gain access to the Internet at one time. In other words, multiple computer accessing to the Internet simultaneously is not possible. Moreover, the user has to install a dial-up software, a driver, and application programs into the computer after connecting the ADSL modem to the computer. However, it is often that a user cannot make a successful installation, resulting in frustration. For developers, they also experience difficulties in designing and/or updating such various drivers and application programs with respect to a variety of platforms and/or operating systems (OSs).

(2) ADSL router. A user may couple an ADSL router to an associated local network server. A NAT (Network Address Translation) is provided in the ADSL router. As such, a computer of local network may use TCP/IP (Transmission Control Protocol/Internet Protocol) to share an IP address with other computers by means of NAT. Thereafter, many users using the local network may have access to the Internet through the ADSL router and once accessed, a user may use the computer to transmit data, receive data, and/or browse. However, the user has to pay a high fee for using an ADSL modem in addition to installing a dial-up software, a driver, and application programs into the computer. As such, the cost is prohibitively high. Moreover, computers coupled to the local network can only obtain translated addresses rather than authorized IP addresses. Hence, for some application software packages using authorized IP addresses (e.g., online video games, VoIP services or the like), a user cannot use such software packages over ADSL. Such problem may be solved by using a special design. However, for most users it is a very difficult task to achieve. Hence, a need for improvement exists.

SUMMARY OF THE INVENTION

A primary object of the present invention is to provide an ADSL modem for providing an IPoA, a PPPoA, or a PPPoE based dial-up networking service over Ethernet. The ADSL modem comprises a DHCP server coupled to at least one computer, each computer being adapted to use a DHCP provided by the OS thereof to obtain an authorized IP address and associated settings from an ISP through an ADSL line and the DHCP server without involving the installation of a dial-up software, a driver, or an application program. Next, set a corresponding IP address and associated settings in each computer through the DHCP server. Responsive to the computer obtaining the authorized IP address and associated settings, one of a PPPoA dial-up protocol, a PPPoE dial-up protocol, and an IPoA dial-up protocol is used to dial up for accessing the Internet. By utilizing the ADSL modem of the present invention, it is possible of not only assigning the authorized IP address to a plurality of computers coupled to a local network but also carrying out a manufacturing cost lower than the ADSL router. As an end, the purpose of enabling the plurality of computers to access the Internet can be achieved. Moreover, the present invention can overcome the above drawbacks of the prior art.

One object of the present invention is to provide a DHCP server in the ADSL modem, the DHCP server being coupled to a plurality of computers so that each computer may use a DHCP provided by the OS thereof to obtain an authorized IP address and associated settings from the ISP through the ADSL line and the DHCP server without involving the installation of any driver or application program.

Another object of the present invention is to provide a PPP dial-up software in the ADSL modem so that it is possible of performing the PPP dial-up software to use a PPPoA dial-up protocol, a PPPoE dial-up protocol, or an IPoA dial-up protocol to dial up for coupling to the ISP for obtaining the authorized IP address and associated settings and setting a corresponding IP address and associated settings of each computer through the DHCP server.

Still another object of the present invention is to enable the ADSL modem to automatically convert the sent Ethernet packet into a packet based on an Internet accessing mode set by a user. The packet is adapted to send over the Internet through the ISP by using the PPPoA dial-up protocol, the PPPoE dial-up protocol, or the IPoA dial-up protocol.

The above and other objects, features and advantages of the present invention will become apparent from the following detailed description taken with the accompanying drawings.

DETAILED DESCRIPTION OF THE PREFERRED EMBODIMENTS

For most modern OSs of computer, a DHCP (Dynamic Host Configuration Protocol) is used. DHCP is used to allow at least one computer to broadcast through its own Ethernet address and obtain settings of associated IP address, netmask, default gateway, and DNS (Domain Name System) of a DHCP server. Thus, preferably a DHCP server should be set in advance. Next, computers may automatically obtain an authorized IP address and associated settings from the DHCP server by using DHCP provided by the OS thereof rather than translate and set a corresponding IP address and associated settings from the computers in a tedious way.

Figure 1:
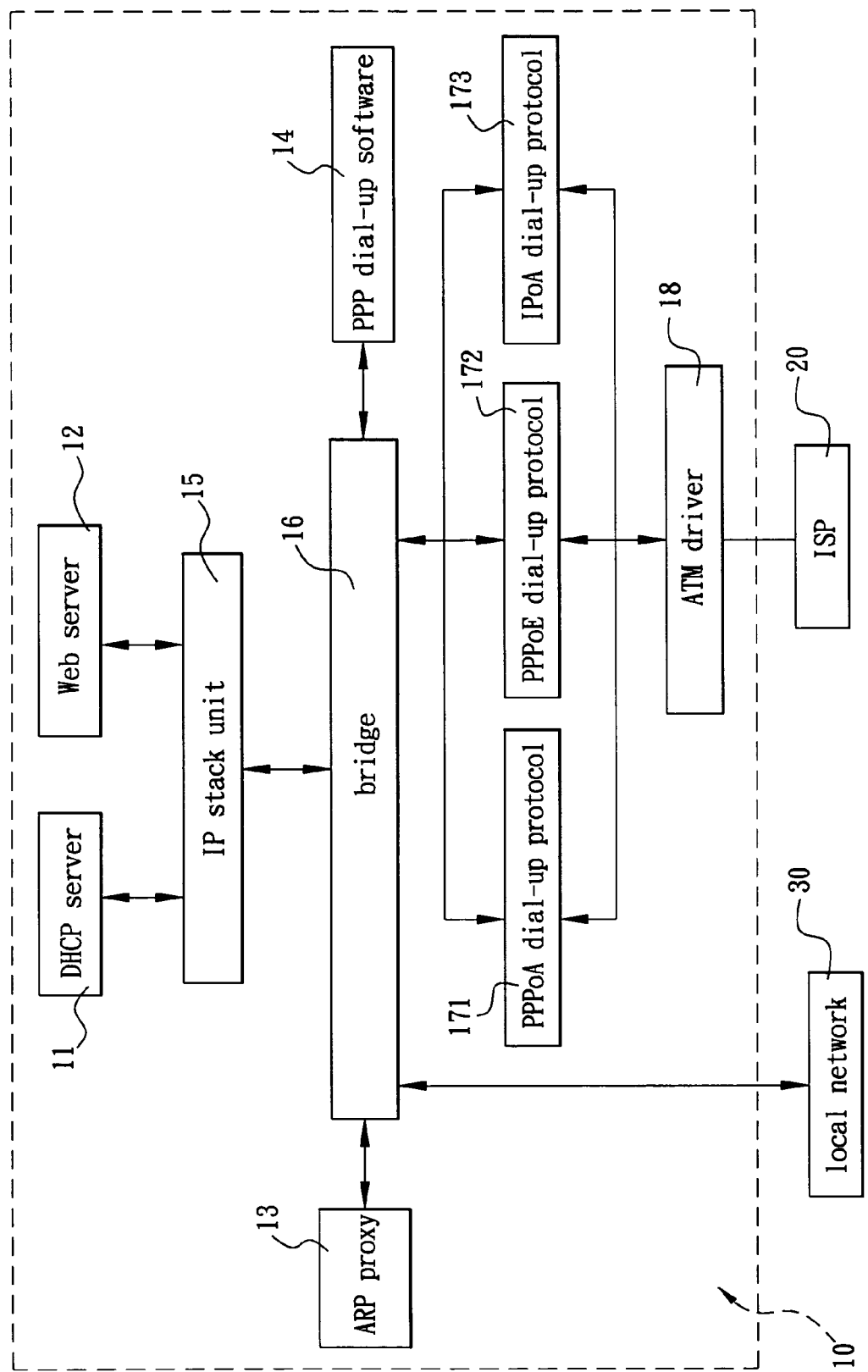
FIG. 1 is a block diagram of ADSL modem of a preferred embodiment according to the invention.

Referring to FIG. 1, there is shown an ADSL modem 10 in accordance with the invention. As stated above, DHCP is used in most OSs of computer. In the ADSL modem 10 there is provided a DHCP server 11 for coupling to a plurality of computers. Also, the computers may use a DHCP provided by the OS thereof to obtain an authorized IP address and associated settings from an ISP through the DHCP server 11 in the ADSL modem 10 without involving the installation of any driver or application program. Next, set a corresponding IP address and associated settings in respective computers through the DHCP server 11. In the ADSL modem 10 of a preferred embodiment according to the invention as shown in FIG. 1, in the ADSL modem 10 there are provided a DHCP server 11, a Web server 12, an ARP (Address Resolution Protocol) proxy 13, and a PPP (Point-to-Point Protocol) dial-up software 14. The DHCP server 11 ad the Web server 12 are coupled to an IP stack unit 15. The IP stack unit 15, the ARP proxy 13, and the PPP dial-up software 14 are coupled to a bridge 16 respectively. The bridge 16 is coupled to at least one computer (not shown) which is also coupled to the local network 30. The bridge 16 is in turn coupled to a plurality of dial-up protocols including a PPPoA dial-up protocol 171, a PPPoE dial-up protocol 172, and an IPoA dial-up protocol 173 respectively. As such, a user can use a desired one of the dial-up protocols to dial up for coupling to an ISP 20 via an ATM (Asynchronous Transfer Mode) driver 18.

Figure 2:
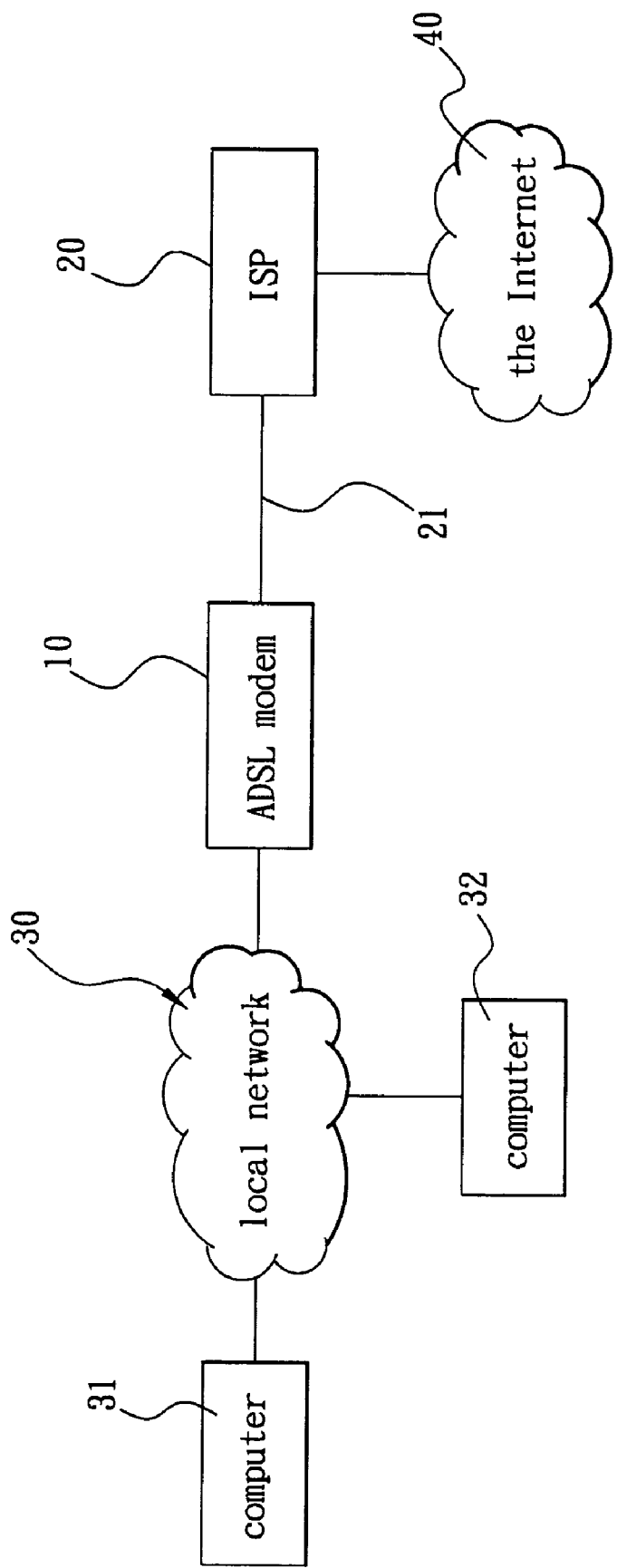
FIG. 2 is a block diagram depicting the connection of computers, a local network, an ADSL modem, an ISP, and the Internet according to the invention.

Referring to FIGS. 1 and 2, in the preferred embodiment the ADSL modem 10 uses ports to couple to a plurality of computers 31, 32 via the local network 30 and an ADSL line 21 respectively. Next, the computers 31, 32, the ADSL modem 10, and the ISP 20 can communicate each other by performing a process (as detailed later) in which the computers 31, 32 can couple to the ISP 20 via the DHCP server 11 in the ADSL modem 10 and the ADSL line 21 and obtain an authorized IP address from the ISP 20 by using DHCP provided by the OS. As an end, the purpose of accessing the Internet 40 via the ISP 20 can be achieved. The process comprises the following steps.

(1) Any computer (e.g., computer 31) coupled to the local network 30 can send a discovery packet associated with DHCP for searching the DHCP server 11. The DHCP server 11 will temporarily assign a dedicated IP address at 192.168.0.2, a gateway at 192.168.0.1, and a DNS at 192.168.0.1 to the computer 31 after the ADSL modem 10 has received the discovery packet.

(2) At the moment, the computer 31 may lease the dedicated settings. In the embodiment of the invention the lease time of DHCP is set as 10 seconds. Next, a browser is coupled to the ADSL modem 10. A user then chooses a desired one of the plurality of dial-up protocols including the PPPoA dial-up protocol 171, the PPPoE dial-up protocol 172, and the IPoA dial-up protocol 173. In a case of the PPPoA dial-up protocol 171 and the PPPoE dial-up protocol 172 being chosen, a user name and a password are required to set. In another case of the IPoA dial-up protocol 173 being chosen, an address authorized by the ISP 20 is required to set. After finishing settings for accessing the Internet, the computer 31 will issue a DNS packet to the assigned DNS at 192.168.0.1 or issue an IP packet to the authorized IP address based on the settings.

(3) The ADSL modem 10 then checks whether the Ethernet packet issued by the computer 31 is a DNS request packet or a packet to be sent to the authorized IP address. If the former is yes, the ADSL modem 10 then checks an Internet accessing mode of the computer 31 sending the packet. If the mode is a dial-up mode, the ADSL modem 10 then performs the PPP dial-up software 14 to access the Internet by dialing up the ISP 20 via the ADSL line 21 after identifying the user name and the password.

(4) After having accessed the Internet by dialing up, the ISP 20 will provide the authorized IP address at 172.16.1.1 and the gateway at 172.16.1.254 to the ADSL modem 10.

(5) After the ADSL modem 10 having obtained the authorized IP address at 172.16.1.1 and the gateway at 172.16.1.254, an updating about settings of the IP address, the gateway, and the DNS in the DHCP server 11 corresponding to the computer will be performed for modifying the entry of DHCP.

(6) After the lease time has lapsed, the computer 31 will issue a DHCP request packet to the DHCP server 11 for updating the IP address and associated settings of the computer 31.

(7) After the DHCP server 11 has received the DHCP request packet, the DHCP server 11 will issue a DHCP NAK signal to the computer 31 for authorizing the computer 31 to use the authorized IP address at 172.16.1.1 and the gateway at 172.16.1.254.

(8) At the moment, the computer 31 issues a DHCP discovery packet again for searching the DHCP server 11. The DHCP server 11 will assign the authorized IP address at 172.16.1.1 and the gateway at 172.16.1.254 to the computer 31 after the ADSL modem 10 has received the DHCP discovery packet. As a result, the computer 31 can obtain the authorized IP address and associated settings.

(9) In such a manner, after receiving the Ethernet packet from the computer 31, the ADSL modem 10 will encapsulate the packet by means of a desired one of the dial-up protocols (e.g., the PPPoA dial-up protocol 171, the PPPoE dial-up protocol 172, or the IPoA dial-up protocol 173) prior to sending via the ADSL line 21.

In the embodiment, the computer 31 obtains the authorized IP address and associated settings via the DHCP server 11 in which the IP address and the ADSL modem 10 are not at the same subnet (i.e., a subnet divided from the same network using TCP/IP). At this time, the computer 31 has to send the packet to the gateway. Hence, the ARP proxy 13 has to set the IP address of the gateway so that the computer 31 can set the ADSL modem 10 as a gateway.

After receiving a packet sent from the Internet 40 at the port, the ADSL modem 10 will check a MAC (Media Access Control) address of the computer 31 based on a destination IP address. Next, the ADSL modem 10 will convert the packet into an Ethernet packet which is in turn sent to the computer 31 via the port of the bridge 16. In this regard, the ADSL modem 10 further comprises a learning unit of MAC address and IP address. After a user has set a user name and a password via a Web page, the learning unit can associate the user name and the password with a used MAC address of computer. Further, a reference table of a MAC address and an IP address will be created after obtaining the authorized IP address. Thus, it is possible of sending a packet received from the Internet 40 to a computer having a corresponding MAC address by referring to the reference table.

In view of the above, an ADSL modem of the invention enables a plurality of computers to obtain an authorized IP address and associated settings from an ISP via a DHCP server by using DHCP provided by an OS and the computers may then automatically dial up for accessing the Internet by using a dial-up protocol (e.g., IPoA, PPPoA, or PPPoE) set by a user. The invention not only can greatly increase the functions of an ADSL modem but also can carry out a simple installation and a reduced manufacturing cost of the ADSL modem. As an end, the purpose of enabling a plurality of computers coupled to a local network to access the Internet can be achieved.

While the invention has been described by means of specific embodiments, numerous modifications and variations could be made thereto by those skilled in the art without departing from the scope and spirit of the invention set forth in the claims.

What is claimed is:

1. An ADSL modem for providing an IPoA, a PPPoA, or a PPPoE based dial-up networking service over Ethernet, comprising:
    a DHCP server coupled to at least one computer, wherein each computer uses a DHCP provided by an OS thereof to obtain an authorized IP address and associated settings from an ISP through the DHCP server, the DHCP server assigns the authorized IP address and the associated settings to each computer, and the DHCP server temporarily assigns a dedicated IP address, a gateway, and a DNS to each computer in response to the ADSL modem receiving a discovery packet from at least one computer coupled to a local network;
    a Web server;
    a PPP dial-up software;
    an ATM driver;
    an IP stack unit coupled to the DHCP server and the Web server respectively; and
    a bridge coupled to the IP stack unit and the PPP dial-up software, enabling the IP stack unit and the PPP dial-up software to connect with at least one computer in the local network through the bridge, and to connect with a PPPoA dial-up protocol, a PPPoE dial-up protocol and an IPoA dial-up protocol through the bridge respectively so that one of the PPPoA dial-up protocol, the PPPoE dial-up protocol, and the IPoA dial-up protocol is used to dial up for coupling to an ISP via the ATM driver,
    wherein in response to receiving an Ethernet packet from the computer, the ADSL modem checks whether the Ethernet packet is a DNS request packet, and if the Ethernet packet is the DNS request packet, the ADSL modem checks an Internet accessing mode of the computer sending the Ethernet packet, and if the Internet accessing mode is a dial-up mode, the ADSL modem identifies a user name and a password and performs the PPP dial-up software to access the Internet by dialing up the ISP via an ADSL line.

2. The ADSL modem of claim 1, wherein in response to dialing up and obtaining the authorized IP address and the gateway from the ISP, the ADSL modem updates the IP address, the gateway, and the DNS in the DHCP server corresponding to the computer for modifying an entry of the DHCP.

3. The ADSL modem of claim 2, wherein in response to obtaining the authorized IP address and the gateway, the DHCP server issues a DHCP NAK signal to the computer for authorizing the computer to use the authorized IP address and the gateway responsive to the ADSL modem receiving a DHCP request packet from the computer.

4. The ADSL modem of claim 3, wherein in response to obtaining the authorized IP address and the gateway, the DHCP server assigns the authorized IP address and the gateway to the computer responsive to the ADSL modem receiving a DHCP discovery packet from the computer.

5. The ADSL modem of claim 4, wherein in response to assigning the authorized IP address and the gateway to the computer by the DHCP server, the ADSL modem encapsulates the Ethernet packet by using one of the PPPoA dial-up protocol, the PPPoE dial-up protocol, and the IPoA dial-up protocol prior to sending the Ethernet packet via the ADSL line responsive to the ADSL modem receiving the Ethernet packet from the computer again.

6. The ADSL modem of claim 5, further comprising an ARP proxy coupled to the bridge wherein the ARP proxy sets an IP address of the gateway for enabling the computer to set the ADSL modem as a gateway.

7. The ADSL modem of claim 6, further comprising a learning unit of MAC address and IP address wherein responsive to setting a user name and a password via a Web page by a user, the learning unit is adapted to associate the user name and the password with a used MAC address of the computer, and responsive to obtaining the authorized IP address, the learning unit creates a reference table of MAC address and IP address so that it is possible of sending a packet received from the Internet to the computer having a corresponding MAC address by referring to the reference table.

8. The ADSL modem of claim 7, wherein responsive to the ADSL modem receiving a packet from the Internet at a port thereof, the ADSL modem checks the MAC address of the computer based on a destination IP address and converts the packet into an Ethernet packet prior to sending the Ethernet packet to computer via a port of the bridge.

* * * * *